United States Patent
Cui et al.

(10) Patent No.: US 8,549,312 B2
(45) Date of Patent: Oct. 1, 2013

(54) MOBILE TERMINAL AND METHOD FOR PROTECTING ITS SYSTEM DATA

(75) Inventors: Shuaixian Cui, Shenzhen (CN); Wei Luo, Shenzhen (CN); Chijun Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 54 days.

(21) Appl. No.: 13/319,891

(22) PCT Filed: Apr. 8, 2010

(86) PCT No.: PCT/CN2010/071626
§ 371 (c)(1),
(2), (4) Date: Nov. 10, 2011

(87) PCT Pub. No.: WO2010/130171
PCT Pub. Date: Nov. 18, 2010

(65) Prior Publication Data
US 2012/0060215 A1    Mar. 8, 2012

(30) Foreign Application Priority Data
May 12, 2009    (CN) .......................... 2009 1 0107309

(51) Int. Cl.
*G06F 21/00*    (2013.01)
(52) U.S. Cl.
USPC .............. 713/182; 455/410; 455/411; 726/34
(58) Field of Classification Search
USPC ................. 713/181–186; 726/16–21, 26–30, 726/34–36; 455/410, 411
See application file for complete search history.

(56) References Cited

U.S. PATENT DOCUMENTS

| | | | | |
|---|---|---|---|---|
| 5,669,905 | A | * | 9/1997 | Scheldrup et al. .............. 606/32 |
| 6,941,128 | B2 | | 9/2005 | Takahashi et al. |
| 8,050,654 | B2 | | 11/2011 | Fukaya et al. |

(Continued)

FOREIGN PATENT DOCUMENTS

| CN | 1378403 A | 11/2002 |
|---|---|---|
| CN | 1758786 A | 4/2006 |

(Continued)

OTHER PUBLICATIONS

International Search Report for PCT/CN2010/071626, English translation attached to original, Both completed by the Chinese Patent Office on Jun. 9, 2010, All together 10 pages.

*Primary Examiner* — Nirav B Patel
(74) *Attorney, Agent, or Firm* — Brooks Kushman P.C.

(57) ABSTRACT

A mobile terminal and a method for protecting system data of the mobile terminal, wherein the critical system data of the mobile terminal is stored into the singlechip with 128-bits ID code, and the method of the public password encryption of the mobile terminal is applied such that the user has to pass the password authentication when the user accesses the data stored in the singlechip, thus protecting important system data of the mobile terminal, thereby protecting the legal right of the mobile terminal manufacturer, avoiding the counterfeit mobile terminal stealing the related technique of the mobile terminal, and prompting the normal development of the mobile terminal market at the same time.

17 Claims, 2 Drawing Sheets

(56) References Cited

U.S. PATENT DOCUMENTS

| | | | |
|---|---|---|---|
| 2002/0046342 A1* | 4/2002 | Elteto et al. | 713/185 |
| 2003/0074566 A1* | 4/2003 | Hypponen | 713/183 |
| 2008/0064370 A1 | 3/2008 | Fukaya et al. | |
| 2008/0076394 A1* | 3/2008 | Fukaya et al. | 455/413 |
| 2008/0320588 A1* | 12/2008 | Lipetz | 726/19 |
| 2009/0170473 A1* | 7/2009 | Bauernfeind et al. | 455/411 |
| 2009/0270072 A1* | 10/2009 | Hsu et al. | 455/411 |

FOREIGN PATENT DOCUMENTS

| | | |
|---|---|---|
| CN | 1811813 A | 8/2006 |
| CN | 1980420 A | 6/2007 |
| CN | 101167394 A | 4/2008 |
| CN | 101171866 A | 4/2008 |
| CN | 101459516 A | 6/2009 |
| JP | 2003085466 A | 3/2003 |

* cited by examiner

MOBILE TERMINAL AND METHOD FOR PROTECTING ITS SYSTEM DATA

CROSS-REFERENCE TO RELATED APPLICATION

This application is the U.S. national phase of PCT Appln. No. PCT/CN2010/071626 filed Apr. 8, 2010 which claims priority to Chinese Application No. 200910107309.X filed May 12, 2009, the disclosures of which are incorporated in their entirety by reference herein.

TECHNICAL FIELD

The present invention relates to the mobile communication technical field, and particularly, to a mobile terminal and a method for protecting system data of this kind of mobile terminal.

BACKGROUND OF THE RELATED ART

The mobile terminal developed from the initial mobile terminal only having the call function, to the mobile terminal being able to send short messages, and to the mobile terminal being able to play game, watch movies and even being able to install self-required functions according to self requirements, and besides having a qualitative leap in the hardware device, the functions of the operating system of the mobile terminal become more and more strong and complicated.

The operating system of the mobile terminal developed from the initial fixed kernel module, to the complicated operating system used on the intelligent mobile terminal, for example the normally used LINUX system, the MOBILE system of the INTER company, the Mac OS X operating system of the APPLE company, the SYBIAN operating system of the NOKIA company, the ANDORID operating system of the GOOGLE company, and the Palm OS operating system of the PALM company.

Since developing these systems needs a lot of research expenses, how to protect the self-developed system from being stole is becoming one of problems to be considered by the mobile terminal manufacturers.

SUMMARY OF THE INVENTION

The technical problem to be solved in the present invention is to provide a mobile terminal and a method for protecting system data of the mobile terminal, which can effectively prevent the system data of the mobile terminal being replicated illegally, and can open the system with control according to the level of the user.

The present invention discloses a mobile terminal, and comprises a master control module, and said mobile terminal further comprises a singlechip;

said singlechip is for storing system data of the mobile terminal;

said master control module is for prompting a user to input a public password of the mobile terminal when the user request for operating the system data stored in the singlechip is received, and judging whether the password input by the user is correct; and is further for executing an operation request of the user when the password input by the user is correct.

Said singlechip is connected with said master control module through an Inter IC (I²C) Bus interface or a Serial Peripheral Interface (SPI).

Said singlechip is further for carrying out an irreversible secure hash calculation on a stored initialization code and related parameters, and sending a calculation result to said master control module;

said master control module is further for carrying out an irreversible secure hash calculation on the password input by the user and the related parameters, comparing whether a calculation result is consistent with the calculation result received from the singlechip, and judging whether the password input by the user is correct.

Said related parameters include an identification (ID) code of the singlechip, a system random number, and a function code corresponding to the operation request of the user, and said system random number is generated by said master control module and is sent to said singlechip;

correspondingly, said singlechip is further for carrying out the irreversible secure hash calculation on the ID code, the initialization code, the function code corresponding to the operation request of the user and said random number stored on-chip when receiving the system random number sent by the master control module, and returning the calculation result to said master control module;

said master control module is further for reading the ID code of the singlechip from said singlechip after the user inputting the password, carrying out the irreversible secure hash calculation on the read ID code and the password input by the user, and extracting a temporary stored code of a preset length from the calculation result; is for generating the system random number, and sending the system random number to said singlechip; is for reading the function code from the singlechip corresponding to the operation request of the user, carrying out the irreversible secure hash calculation on said function code, system random number, temporary stored code and ID code of said singlechip, and comparing whether the calculation result is consistent with the calculation result received from the singlechip.

Said singlechip is further for carrying out the irreversible secure hash calculation on the ID code stored on-chip and a public password of the singlechip, extracting the initialization code of the preset length from the calculation result, and writing the extracted initialization code into a password storage area of said singlechip.

A capacity of an on-chip Erasable Programmable Read-Only Memory (EPROM) of said singlechip is at least 2048 bits.

The present invention further discloses a method for protecting system data of a mobile terminal, and this method comprises:

a master control module prompting a user to input a password when the user request for operating the system data stored in a singlechip is received, and judging whether the password input by the user is correct, and if yes, executing an operation request of the user.

A particular operation of judging whether the password input by the user is correct is:

said singlechip carrying out an irreversible secure hash calculation on stored initialization code and related parameters, and sending a calculation result to said master control module;

said master control module carrying out the irreversible secure hash calculation on the password input by the user and the related parameters, and comparing whether a calculation result is consistent with the calculation result received from the singlechip to judge whether the password input by the user is correct.

This method further comprising: said singlechip writing an initialization code during initialization;

a process of the initialization of said singlechip comprises: carrying out the irreversible secure hash calculation on an ID code stored inside the singlechip and a public password of the mobile terminal, extracting the authentication code of a preset length from the calculation result, and writing the extracted authentication code into a password storage area of said singlechip.

Said master control module carrying out the irreversible secure hash calculation on the password input by the user and the related parameters particularly comprises: carrying out the irreversible secure hash calculation based on the password input by the user and the ID code of the singlechip, extracting a temporary stored code of a preset length from a calculation result and further carrying out the irreversible secure hash calculation on said temporary stored code and the related parameters.

Said related parameters include an ID code of the singlechip, a system random number, and a function code corresponding to the operation request of the user, and said system random number is generated by said master control module and is sent to said singlechip.

The preset length of said initialization code is equal to the preset length of said temporary stored code, and a value range of said preset length is 64~320.

The present invention stores critical system data of the mobile terminal into the singlechip with 128-bits ID code, and applies the method of the public password encryption of the mobile terminal such that the user have to pass the password authentication when the user accesses data stored in the singlechip, thus protecting important system data of the mobile terminal, thereby protecting the legal right of the mobile terminal development manufacturer, avoiding the counterfeit mobile terminal stealing the related technique of the mobile terminal, and prompting the normal development of the mobile terminal market at the same time.

PREFERRED EMBODIMENTS OF THE PRESENT INVENTION

Below it will further describe the present invention with reference to the accompany drawings and preferable examples in detail.

Figure 1:
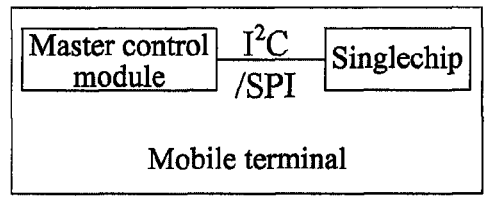
FIG. 1 is a schematic diagram of the structure of the mobile terminal according to the present invention.
Figure 2:
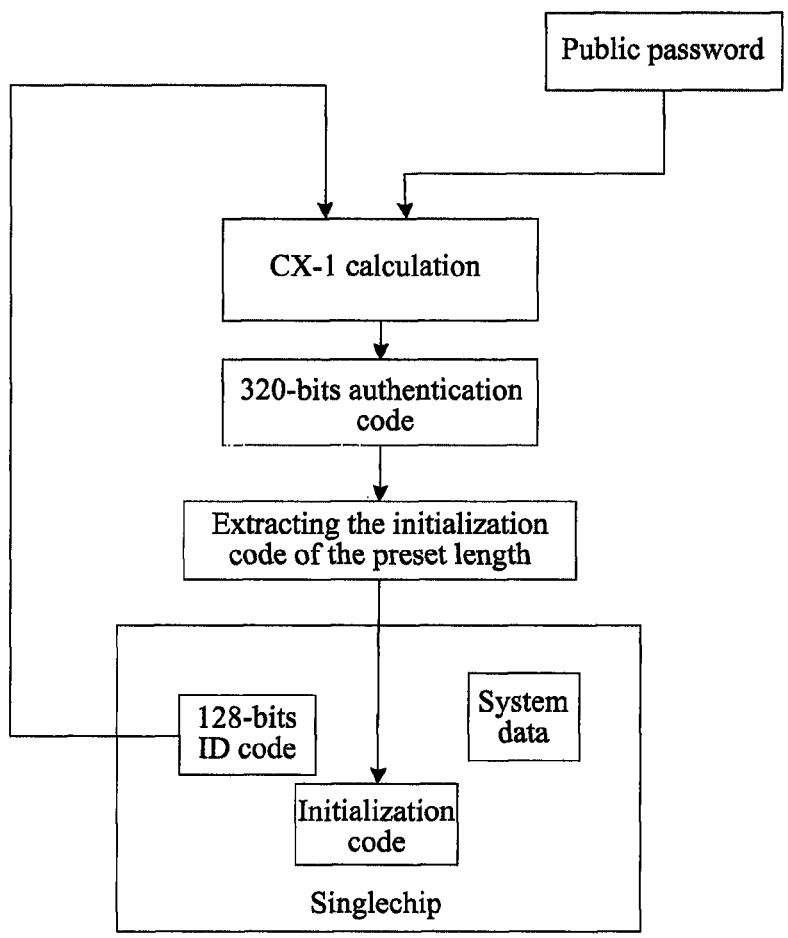
FIG. 2 is a schematic diagram of the initialization process of the singlechip according to the present invention.

As shown in FIG. 1, it is a schematic diagram of the structure of said mobile terminal according to the present invention, and the mobile terminal comprises a master control module and a singlechip, wherein, the singlechip has a 128-bits ID code, this ID code is written into on-chip read-only ROM of the singlechip when being ex-factory and is unable to be modified, and is the unique identifier of the identification of the singlechip; and the minimal capacity of its on-chip EPROM is 2084 bits, which is for storing system data of the mobile terminal; the system data include the system initialization parameter, the correction parameter, the function parameter, and the software version information and so on, and the stored system data are externally represented as the function code; the singlechip is for carrying out the CX-1 calculation on the on-chip stored ID code, the initialization code, the function code corresponding to the operation request of the user and the random number when receiving the system random number sent by the master control module, and sending the calculation result to the master control unit;

the initialization code is written inside during initialization of the singlechip, and as shown in FIG. 2, the process of initialization of the singlechip is: carrying out the CX-1 calculation on the ID code of the singlechip and the public password of the mobile terminal (this public password is defined and provided by the mobile terminal development manufacturer, each terminal type has one specified public password, and the user will get the corresponding public password when purchasing the legal version operating system), extracting the initialization code of the preset length from the calculation result, and writing the extracted initialization code into the password storage area of the singlechip. If it is not wished that the initialization code stored in the password storage area is rewritten, the password storage area of the singlechip can be set to write protection, and make this process to be irreversible.

The master control module is for prompting the user to input the password when the user request for operating the system data stored in the singlechip is received, and is for reading the ID code of the singlechip from the singlechip after the user inputs the password, carrying out the CX-1 calculation on the read ID code and the password input by the user, and extracting the temporary stored code of the preset length from the calculation result; is for generating the system random number, and sending the system random number to the singlechip; is for reading the function code corresponding to the operation request of the user from the singlechip, and carrying out the CX-1 calculation on the function code, the system random number, the extracted authentication code and the ID code of the singlechip; is for comparing whether the calculation result and the received calculation result of the singlechip are consistent; and is for allowing the user operation when the two calculation results are consistent; prompting the user that the password is wrong when the two calculation results are inconsistent;

the singlechip communicates with the master control module through the I2C interface or the SPI interface.

Figure 3:
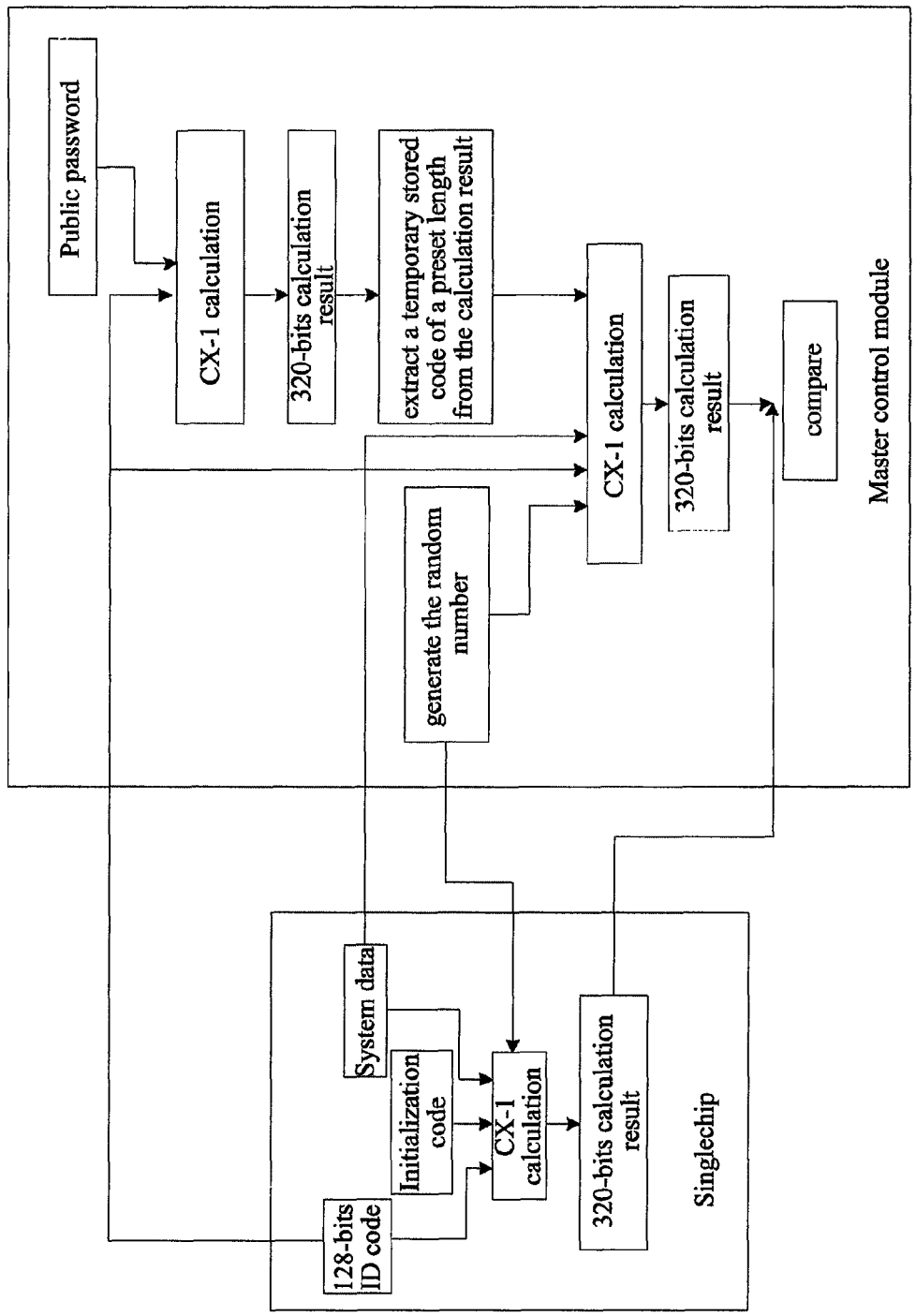
FIG. 3 is a schematic diagram of the whole flow of the method according to the present invention.

As shown in FIG. 3, it is the schematic diagram of the flow of the method according to the present invention, and particularly comprises:

step (1), the master control module receives the request for operating the system data stored in the singlechip of the user.

The system data includes the system initialization parameter, the correction parameter, the function parameter, and the software version information and so on. The mobile terminal manufacture stores function configuration information of the mobile terminal into the on-chip EPROM of the singlechip in the form of the function code, each bit of the function code denotes one specified function, 1 denotes that this function is available, and 0 denotes that the user does not have the authority to use this function, and thus, controlled opening of system functions can be implemented regarding to different user levels based on the same hardware platform. For example, when it is required to access the systematized parameters, the systematized parameters is encapsulated in the form of the function code, and the function code acts as the external representation of the systematized parameters.

Step (2), the user is prompted to input the password of this mobile terminal.

Step (3), the 128-bits ID code of the singlechip is read.

Step (4), the received password and the read 128-bits ID code are carried out the CX-1 calculation to obtain the 320-bits calculation result.

Step (5), a temporary stored code of the preset length (optional 64 bits to 320 bits) is extracted from the calculation result.

The preset length in this step is equal to the preset length used during the initialization of the singlechip.

Step (6), the master control module generates the system random number, and sends the system random number to the singlechip.

Step (7): the singlechip carries out the CX-1 calculation on the random number, the own ID code, the function code corresponding to the operation request of the user and the initialization code after receiving the random number, and sends the obtained 320-bits calculation result to the master control module.

Step (8), the master control module reads the function code corresponding to the operation request of the user from the singlechip.

Step (9), the master control module carries out the CX-1 calculation on the extracted temporary stored code, the read function code, ID code and the generated random number to obtain 320-bits calculation result.

Step (10), the master control module compares whether the own calculation result and the received calculation resulted of the singlechip are consistent, and if yes, the password input by the user is correct, and step (11) is executed, or else, the password input by the user is wrong, and step (12) is executed.

Step (11), the operation request of the user is executed.

Step (12), the user is prompted that the password is wrong, and the user does not have the authority to carry out the corresponding operation.

Below it is a particular application of the present invention: when the user is required to call a certain function, the master control module of the mobile terminal will read the corresponding function code from the EPROM of the singlechip, and judge whether the user has the authority of using this function, and if the user has the authority of using this function, then call the corresponding function, or else, it is prompted that the user does not have the authority of using this function. When the user wants to operate the function code, the master control module prompts the user to input the public password of this mobile terminal, and if the input of the user is correct, then this user is the authorized user, and is allowed to operate; if the input of the user is wrong, then this user is considered as the unauthorized user, and it is prompted that the user does not have the authority of operations.

The present invention adopts the low cost singlechip as the main part of the hardware circuit, and protects the pre-developed code of the manufacture and critical data parameters with the combination of the brief method, and will play a more and more important role in the mobile terminal circuit of the future.

The above description is only preferable examples of the present invention, and is not for limiting the present invention.

What is claimed is:

1. A mobile terminal, comprising a master control module, and said mobile terminal further comprising a singlechip; wherein
said singlechip is for storing system data of the mobile terminal;
said master control module is for prompting a user to input a password when a user request for operating the system data stored in the singlechip is received, and judging whether the password input by the user is correct; and is further for executing an operation request of the user when the password input by the user is correct;
wherein said singlechip is further for carrying out an irreversible secure hash calculation on stored initialization code and related parameters, and sending a calculation result to said master control module;
said master control module is further for carrying out an irreversible secure hash calculation on the password input by the user and the related parameters, comparing whether a calculation result is consistent with the calculation result received from the singlechip, and judging whether the password input by the user is correct; and
wherein said related parameters include an identification (ID) code of the singlechip, a system random number, and function code corresponding to the operation request of the user.

2. The mobile terminal as claimed in claim 1, wherein said singlechip is connected with said master control module through an Inter IC (I²C) bus interface or a Serial Peripheral Interface (SPI).

3. The mobile terminal as claimed in claim 1, wherein said system random number is generated by said master control module and is sent to said singlechip;
correspondingly, said singlechip is further for carrying out the irreversible secure hash calculation on the ID code, the initialization code, the function code corresponding to the operation request of the user and said random number stored on-chip when receiving the system random number sent by the master control module, and returning the calculation result to said master control module;
said master control module is further for reading the ID code of the singlechip from said singlechip after the user inputs the password, carrying out the irreversible secure hash calculation on the read ID code and the password input by the user, and extracting a temporary stored code of a preset length from the calculation result; for generating the system random number, and sending the system random number to said singlechip; for reading the function code corresponding to the operation request of the user from the singlechip, carrying out the irreversible secure hash calculation on said function code, system random number, temporary stored code and ID code of said singlechip, and comparing whether the calculation result is consistent with the calculation result received from the singlechip.

4. The mobile terminal as claimed in claim 3, wherein said singlechip is further for carrying out the irreversible secure hash calculation on the ID code stored on-chip and a public password of the singlechip, extracting the initialization code of the preset length from the calculation result, and writing the extracted initialization code into a password storage area of said singlechip.

5. The mobile terminal as claimed in claim 1, wherein a capacity of an on-chip erasable programmable read only memory of said singlechip is at least 2048 bits.

6. The mobile terminal as claimed in claim 2, wherein a capacity of an on-chip erasable programmable read only memory of said singlechip is at least 2048 bits.

7. The mobile terminal as claimed in claim 1, wherein a capacity of an on-chip erasable programmable read only memory of said singlechip is at least 2048 bits.

8. The mobile terminal as claimed in claim 3, wherein a capacity of an on-chip erasable programmable read only memory of said singlechip is at least 2048 bits.

9. The mobile terminal as claimed in claim 4, wherein a capacity of an on-chip erasable programmable read only memory of said singlechip is at least 2048 bits.

10. A method for protecting system data of a mobile terminal, comprising:
- a master control module prompting a user to input a password when a user request for operating the system data stored in a singlechip is received, and judging whether the password input by the user is correct, and if yes, executing an operation request of the user;
- wherein a particular operation of judging whether the password input by the user is correct is:
- said singlechip carrying out an irreversible secure hash calculation on stored initialization code and related parameters, and sending a calculation result to said master control module;
- said master control module carrying out the irreversible secure hash calculation on the password input by the user and the related parameters, and comparing whether a calculation result is consistent with the calculation result received from the singlechip to judge whether the password input by the user is correct; and
- wherein said related parameters include an ID code of the singlechip, a system random number, and a function code corresponding to the operation request of the user.

11. The method for protecting system data of the mobile terminal as claimed in claim 10, further comprising: said singlechip writing an initialization code during initialization;
- a process of the initialization of said singlechip comprising: carrying out the irreversible secure hash calculation on an ID code stored inside the singlechip and a public password of the mobile terminal, extracting the initialization code of a preset length from the calculation result, and writing the extracted initialization code into a password storage area of said singlechip.

12. The method for protecting system data of the mobile terminal as claimed in claim 10, wherein said master control module carrying out the irreversible secure hash calculation on the password input by the user and the related parameters particularly comprises: carrying out the irreversible secure hash calculation based on the password input by the user and the ID code of the singlechip, extracting a temporary stored code of a preset length from a calculation result and further carrying out the irreversible secure hash calculation on said temporary stored code and the related parameters.

13. The method for protecting system data of the mobile terminal as claimed in claim 10, wherein said system random number is generated by said master control module and is sent to said singlechip.

14. The method for protecting system data of the mobile terminal as claimed in claim 11, wherein a value of the preset length of said initialization code is equal to that of the preset length of said temporary stored code, and a range of the value of said preset length is 64~320.

15. The method for protecting system data of the mobile terminal as claimed in claim 11, wherein said related parameters include an ID code of the singlechip, a system random number, and a function code corresponding to the operation request of the user, and said system random number is generated by said master control module and is sent to said singlechip.

16. The method for protecting system data of the mobile terminal as claimed in claim 12, wherein said related parameters include an ID code of the singlechip, a system random number, and a function code corresponding to the operation request of the user, and said system random number is generated by said master control module and is sent to said singlechip.

17. The method for protecting system data of the mobile terminal as claimed in claim 12, wherein a value of the preset length of said initialization code is equal to that of the preset length of said temporary stored code, and a range of the value of said preset length is 64~320.

* * * * *